(12) United States Patent
Kobayashi et al.

(10) Patent No.: US 9,354,893 B2
(45) Date of Patent: May 31, 2016

(54) DEVICE FOR OFFLOADING INSTRUCTIONS AND DATA FROM PRIMARY TO SECONDARY DATA PATH

(75) Inventors: Yuki Kobayashi, Kanagawa (JP);
Shohei Nomoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 793 days.

(21) Appl. No.: 13/482,630

(22) Filed: May 29, 2012

(65) Prior Publication Data

US 2012/0311305 A1 Dec. 6, 2012

(30) Foreign Application Priority Data

May 31, 2011 (JP) ................................. 2011-122095

(51) Int. Cl.
*G06F 9/38* (2006.01)
(52) U.S. Cl.
CPC ............ *G06F 9/3891* (2013.01); *G06F 9/3889* (2013.01); *G06F 9/3893* (2013.01)
(58) Field of Classification Search
CPC .... G06F 9/3893; G06F 9/3889; G06F 9/3891
USPC .......................................................... 712/34
See application file for complete search history.

(56) References Cited

U.S. PATENT DOCUMENTS 5,664,214 A * 9/1997 Taylor et al. ..................... 712/20
6,247,113 B1 * 6/2001 Jaggar ............................ 712/200
6,446,190 B1 9/2002 Barry et al.

(Continued)

FOREIGN PATENT DOCUMENTS

JP 2001-175470 A 6/2001
JP 2002-539519 A 11/2002

(Continued)

OTHER PUBLICATIONS

Kenneth C Yeager, The MIPS R10000 Superscalar Microprocessor, 1996, IEEE, 0272-1732/96, 13 pages, [retrieved from the internet on Jan. 16, 2015], retrived from URL <http://people.cs.pitt.edu/~cho/cs2410/papers/yeager-micromag96.pdf>.*

(Continued)

*Primary Examiner* — Andrew Caldwell
*Assistant Examiner* — Jyoti Mehta
(74) *Attorney, Agent, or Firm* — Foley & Lardner LLP

(57) ABSTRACT

Provided is an information processing device including an instruction cache, a data cache, first and second arithmetic unit groups including a plurality of arithmetic units capable of parallel operation, a first arithmetic-control circuit that generates one or more operation instructions for the first arithmetic unit group, and a second arithmetic-control circuit that generates one or more operation instructions for the second arithmetic unit group based on an instruction code of a fixed instruction register. The first arithmetic unit group sets the instruction code to the fixed instruction register according to an operation instruction generated based on a first specific instruction code by the first arithmetic-control circuit, and provides data to the second arithmetic unit group according to an operation instruction generated based on a second specific instruction code by the first arithmetic-control circuit. The second arithmetic unit group repeats operations based on the operation instructions by the second arithmetic-control circuit.

6 Claims, 14 Drawing Sheets

(56) References Cited

U.S. PATENT DOCUMENTS

| | | |
|---|---|---|
| 6,624,819 B1* | 9/2003 | Lewis .......................... 345/561 |
| 6,782,445 B1 | 8/2004 | Olgiati et al. |
| 7,788,465 B2 | 8/2010 | Pires Dos Reis Moreira et al. |
| 7,853,775 B2 | 12/2010 | Kyo |
| 2002/0013892 A1* | 1/2002 | Gorishek et al. .............. 712/227 |
| 2005/0125637 A1* | 6/2005 | Dijkstra et al. ............... 712/221 |
| 2007/0198815 A1 | 8/2007 | Liu et al. |

FOREIGN PATENT DOCUMENTS

| | | |
|---|---|---|
| JP | 2003-502728 A | 1/2003 |
| JP | 2006-512661 A | 4/2006 |
| JP | 2009-505214 A | 2/2009 |
| WO | WO 00/68782 A1 | 11/2000 |
| WO | WO 2008/023576 A1 | 2/2008 |

OTHER PUBLICATIONS

Shorin Kyo et al., A Low-Cost Mixed—Mode Parallel Processor Architecture for Embedded Systems, Proc. of ACM Int. Conf. on Supercomputing, Jun. 2007, pp. 253-262.

Matsumoto Kenshi et al., Application of an Embedded RISC Architecture "Aleph" to Digital Audio Processing's Proceedings of the 58th National Convention of IPSJ, Information Processing Society of Japan, 1999,. pp. 1-149-1-150.

* cited by examiner

Fig. 2 setofld    addr

Fig. 3 ofld    RA, RB, RD, Lat

Fig. 4

```
setofld    .L_OFLD_INF01    //CYCLE1
ofld       r1, r9, r5, 3    //CYCLE2
ofld       r2, r9, r6, 3    //CYCLE3
ofld       r3, r9, r7, 3    //CYCLE4
ofld       r4, r9, r8, 3    //CYCLE5
```

Fig. 5

```
.L_OFLD_INF01
    0x1134    //MUL r1, r3, r4
    0x2425    //SRLI r4, 2, r7
    0x352F    //ADD r7, r2, r15
    0x0000    //NOP
```

CYCLE 1

PRIMARY DATA PATH

| | |
|---|---|
| r0 | 0 |
| r1 | 3 |
| r2 | 5 |
| r3 | 2 |
| r4 | 4 |
| r5 | x |
| r6 | x |
| r7 | x |
| r8 | x |
| r9 | 20 |
| r10 | x |
| r11 | x |
| r12 | x |
| r13 | x |
| r14 | x |
| r15 | x |

SECONDARY DATA PATH

| | |
|---|---|
| r0 | 0 |
| r1 | x |
| r2 | x |
| r3 | 49 |
| r4 | x |
| r5 | x |
| r6 | x |
| r7 | x |
| r8 | x |
| r9 | x |
| r10 | x |
| r11 | x |
| r12 | x |
| r13 | x |
| r14 | x |
| r15 | x |

OUTPUT QUEUE

| | |
|---|---|
| 3 : | x |
| 2 : | x |
| 1 : | x |
| 0 : | x |

```
*****CALCULATION OF 3x3 SOBEL FILTER*****
long DOUT[480][640]

for(x=1; x<639; x++){
    for(y=1; y<479; y++){
        DOUT[y][x]=(long)DIN[y-1][x-1]-DIN[y-1][x+1]+2*DIN[y][x-1]
                   -2*DIN[y][x+1]+DIN[y+1][x-1]-DIN[y+1][x+1];
    }
}
```

Fig. 12

```
*****CALCULATION OF ADDRESS TO STORE DOUT[y][x]*****
address=y*2560+4*x+base;
```

DEVICE FOR OFFLOADING INSTRUCTIONS AND DATA FROM PRIMARY TO SECONDARY DATA PATH

CROSS-REFERENCE TO RELATED APPLICATIONS

This application is based upon and claims the benefit of priority from Japanese patent application No. 2011-122095, filed on May 31, 2011, the disclosure of which is incorporated herein in its entirety by reference.

BACKGROUND

The present invention relates to an information processing device and, particularly, to an information processing device that includes a plurality of processor elements.

A VLIW (Very Long Instruction Word) processor that allows a plurality of operation instructions to be included in an operation instruction issued at a time has been proposed recently. In instruction codes executed by the VLIW processor, operations that can be executed in parallel in programs are extracted by a compiler. The VLIW processor fetches a plurality of instruction codes that can be executed in parallel and stores them into an instruction register, and decodes the plurality of instruction codes all at once. Then, the VLIW processor causes a plurality of arithmetic units to operate in parallel based on the plurality of operation instructions generated by the decoding.

For example, in applications such as image processing, because calculation used for processing is finite and the same calculation is repeated in many cases, operations that can be executed in parallel can be easily extracted. Therefore, the VLIW processor is effectively used particularly in applications such as image processing. An example of the VLIW processor is disclosed in S. Kyo, et al., "A Low-Cost Mixed-Mode Parallel Processor Architecture for Embedded Systems", Proc. of ACM Int. Conf. on Supercomputing, pp. 253-262, June, 2007 (which is hereinafter referred to as Kyo et al.). The processor described in Kyo et al. includes a plurality of processor elements, each of them configured as the VLIW processor. With inclusion of a plurality of VLIW processors, Kyo et al. enables further improvement of throughput.

SUMMARY

The present inventor has found the following problem. The processor described in Kyo et al. has a problem that there is a limit to the number of operation instructions that can be executed in parallel in one processor element, and the operations beyond the limit value cannot be executed in parallel with the other operations. In other words, the processor described in Kyo et al. has a problem that parallelism of operations cannot be sufficiently improved due to a limit to the number of operations that can be executed in parallel.

An information processing device according to one aspect of the invention includes a first cache that stores a first instruction code, a second cache that stores data to be processed, first and second arithmetic unit groups that execute operations on the data by a plurality of arithmetic units capable of operating in parallel, a first arithmetic-control circuit that reads the first instruction code, and generates one or more operation instructions for the first arithmetic unit group based on the first instruction code, and a second arithmetic-control circuit that includes a fixed instruction register that stores a second instruction code specified by the first arithmetic unit group, and generates one or more operation instructions for the second arithmetic unit group based on the second instruction code. The first instruction code at least includes first and second specific instruction codes. When the operation instructions generated by the first arithmetic-control circuit include a first operation instruction on a basis of the first specific instruction code, the first arithmetic unit group sets the second instruction code to the fixed instruction register in accordance with the first operation instruction, and when the operation instructions generated by the first arithmetic-control circuit include a second operation instruction on a basis of the second specific instruction code, the first arithmetic unit group provides data to be processed by the second arithmetic unit group to the second arithmetic unit group. The second arithmetic unit group repeatedly executes operations on a basis of the operation instructions generated based on the second instruction code by the second arithmetic-control circuit.

In the information processing device according to the aspect of the invention, the second arithmetic unit group executes one or more operations in parallel based on the second instruction code that is set in accordance with the first operation instruction by the first arithmetic unit group. The first operation instruction can be generated together with other operation instructions. Further, the second arithmetic unit group repeatedly executes the same operations until the second instruction code is updated. In this manner, the information processing device according to the aspect of the invention allows operations to be executed in the second arithmetic unit group in parallel with operations in the first arithmetic unit group, without using the entire operating capability of the first arithmetic unit group to issue an operation indication to the second arithmetic unit group. Thus, in the information processing device according to the aspect of the invention, it is possible to execute operations exceeding the limit of the number of parallel operations in the first arithmetic unit group in parallel.

In the information processing device according to an embodiment of the invention, it is possible to improve parallelism for operations.

BRIEF DESCRIPTION OF THE DRAWINGS

The above and other aspects, advantages and features will be more apparent from the following description of certain embodiments taken in conjunction with the accompanying drawings, in which:

FIG. 2 is a view showing a format of a first specific instruction code used in the information processing device according to the first embodiment;

FIG. 3 is a view showing a format of a second specific instruction code used in the information processing device according to the first embodiment;

FIG. 4 is an example of a program using the first and second specific instruction codes used in the information processing device according to the first embodiment;

FIG. 5 is an example of a program that defines an operation instruction by the second specific instruction code used in the information processing device according to the first embodiment;

FIG. 6 is a view showing an operation in a cycle 1 of the information processing device when the programs shown in FIGS. 4 and 5 are executed.

FIG. 11 is a view showing an example of a program executed in a primary data path of the information processing device according to the first embodiment;

FIG. 12 is a view showing an example of a program executed in a secondary data path of the information processing device according to the first embodiment;

DETAILED DESCRIPTION

First Embodiment

Figure 1:
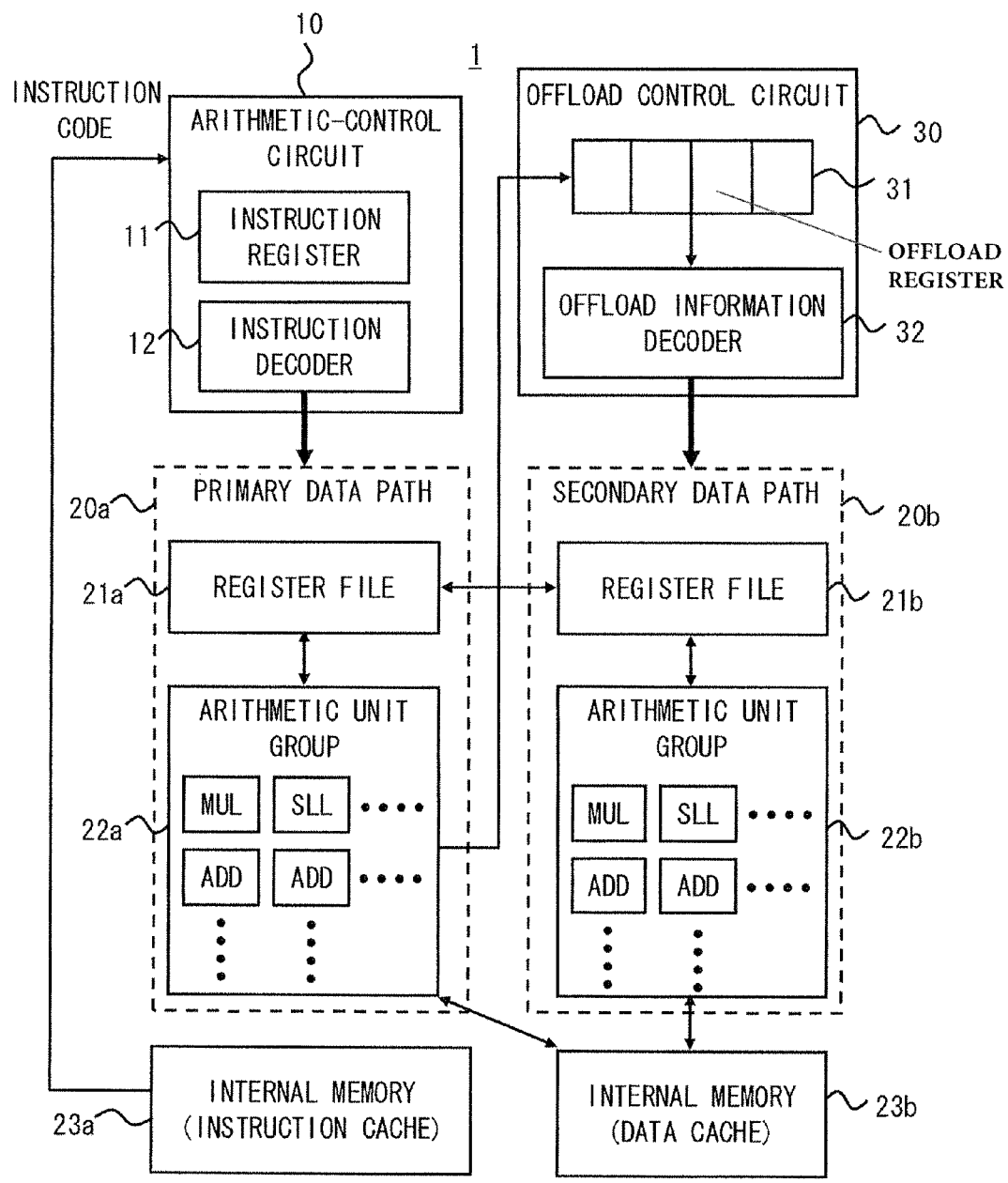
FIG. 1 is a block diagram showing an information processing device according to a first embodiment.

Embodiments of the present invention are described hereinafter with reference to the drawings. FIG. 1 shows a block diagram of an information processing device 1 according to the first embodiment. As shown in FIG. 1, the information processing device 1 includes a first arithmetic-control circuit (for example, an arithmetic-control circuit 10), a primary data path 20*a*, a secondary data path 20*b*, a first cache (for example, an internal memory 23*a*), a second cache (for example, an internal memory 23*b*), and a second arithmetic-control circuit (for example, an offload control circuit 30).

In the primary data path 20*a*, a register file 21*a* and a first arithmetic unit group 22*a* are included. In the secondary data path 20*b*, a register file 21*b* and a second arithmetic unit group 22*b* are included. In the primary data path 20*a*, the first arithmetic unit group 22*a* carries out operations by inputting and outputting data to and from the register file 21*a*. In the secondary data path 20*b*, the second arithmetic unit group 22*b* carries out operations by inputting and outputting data to and from the register file 21*b*. Further, the first arithmetic unit group 22*a* stores data to be processed by the second arithmetic unit group 22*b* into the register file 21*b*. The first arithmetic unit group 22*a* and the second arithmetic unit group 22*b* perform operations on data by a plurality of arithmetic units capable of operating in parallel.

It is assumed that the first arithmetic unit group 22*a* and the second arithmetic unit group 22*b* include a plurality of arithmetic units such as an adder ADD, a multiplier MUL, and a logical shift operation unit SLL. The first arithmetic unit group 22*a* and the second arithmetic unit group 22*b* can execute a plurality of operation instructions in parallel in one cycle. At this time, operations executed in parallel are set in such a way that an arithmetic unit used for the operation does not overlap. Specifically, when there is one multiplier MUL, two multiplications cannot be performed in one cycle. Note that it is preferred that the first arithmetic unit group 22*a* and the second arithmetic unit group 22*b* have the same configuration of arithmetic units First, in the information processing device 1, a first instruction code that specifies operations to be used in the information processing device 1 is stored in the internal memory 23*a*. Thus, the internal memory 23*a* is used as an instruction cache. Further, data to be processed in the information processing device 1 is stored in the internal memory 23*b*. Thus, the internal memory 23*b* is used as a data cache.

The arithmetic-control circuit 10 reads the first instruction code from the internal memory 23*a* and generates one or more operation instructions for the first arithmetic unit group 22*a* on the basis of the first instruction code. Thus, the information processing device 1 operates as a VLIW processor. The first instruction code at least includes first and second specific instruction codes. Although the details of the first and second specific instruction codes are described later, the first specific instruction code is referred to as an offload information setting instruction code, and the second specific instruction code is referred to as an offload processing instruction code in the following description. Further, the first instruction code includes various types of instruction codes (for example, an addition instruction code, a logical shift operation instruction code and the like) other than the first and second specific instruction codes.

The arithmetic-control circuit 10 includes an instruction register 11 and an instruction decoder 12. The arithmetic-control circuit 10 reads the first instruction code and accumulates the read first instruction code into the instruction register 11. Then, the arithmetic-control circuit 10 decodes a plurality of instruction codes arbitrarily selected among the first and second specific instruction codes and the other instruction codes based on a program all at once by the instruction decoder 12. Thus, the instruction decoder 12 generates a plurality of operation instructions at the same time.

The offload control circuit 30 includes a fixed instruction register (for example, an offload register 31) that stores a second instruction code specified by the first arithmetic unit group 22*a*, and generates one or more operation instructions for the second arithmetic unit group 22*b* on the basis of the second instruction code. The offload control circuit 30 includes an offload information decoder 32 in addition to the offload register 31. In the offload register 31, a plurality of instruction codes that can be executed by arithmetic units capable of operating in parallel in the second arithmetic unit group 22*b* are stored as the second instruction code. Then, the offload information decoder 32 decodes the plurality of instruction codes stored in the offload register 31 all at once and thereby generates a plurality of operation instructions at the same time for the second arithmetic unit group 22*b*.

The details of the first specific instruction code (for example, the offload information setting instruction code) and the second specific instruction code (for example, the offload processing instruction code) that are used in the information processing device 1 according to the first embodiment are described hereinbelow. FIG. 2 shows an instruction format of the offload information setting instruction code. As shown in FIG. 2, the offload information setting instruction code is specified by a description "setofld" as a program.

Further, an address "addr" of the data cache that stores a description of offload processing specifying information is described as an argument.

FIG. 3 shows an instruction format of the offload processing instruction code. As shown in FIG. 3, the offload processing instruction code is specified by a description "olfd" as a program. Further, a first source operand RA, a second source operand RB, a destination operand RD, and an output delay cycle number Lat are described as arguments. Note that the first source operand RA is the address of the register file 21a of the primary data path 20a that stores the first data to be operated. The second source operand RB is the address of the register file 21a of the primary data path 20a that stores the second data to be operated. The destination operand RD is the address of the register file 21a of the primary data path 20a that stores operation result data. The output delay cycle number Lat is the number of processing cycles until the destination operand is obtained after the second source operand is given. Note that the number of source operands and destination operands may be set arbitrarily including the case of not specified. Further, in this embodiment, data corresponding to the source operand is stored in registers r1 and r2 of the register file 21b in the secondary data path 20b.

FIG. 4 shows an example of a program that contains the offload information setting instruction code and the offload processing instruction code. As shown in FIG. 4, in order to use the offload control circuit 30 and the secondary data path 20b according to the first embodiment, it is necessary to describe a program using the offload information setting instruction code and the offload processing instruction code. In the example shown in FIG. 4, the offload information setting instruction code (setofld) is described first. It turns out that offload processing specifying information used by the offload information setting instruction code is stored in .L_OFLD_INFO1.

In the example shown in FIG. 4, four offload processing instruction codes (ofld) are described following the offload information setting instruction code. In the first offload processing instruction code, data stored in the registers r1 and r9 are the source operands, and data stored in the register r5 is the destination operand. Further, in the first offload processing instruction code, 3 is set as the output delay cycle number. For the other three offload processing instruction codes, the operands and the output delay cycle number are specified in the same rule as the first offload processing instruction code.

A description related to the offload processing specifying information is described hereinbelow. FIG. 5 shows a program description of the offload processing specifying information. In the example shown in FIG. 5, a multiplication instruction code MUL, a shift right logical instruction code SRLI, an addition instruction code ADD, and a no operation instruction NOP are described as addresses of instruction caches that respectively store the corresponding instructions. Further, in the example shown in FIG. 5, the multiplication instruction code MUL is described as an address to store an instruction code in which the register r1 of the register file 21b of the secondary data path 20b is the first source operand, the register r3 is the second source operand, and the register r4 is the destination operand. The shift right logical instruction code SRLI is described as an address to store an instruction code in which the register r4 of the register file 21b of the secondary data path 20b is the first source operand, the shift amount is two bits, and the register r7 is the destination operand. The addition instruction code ADD is described as an address to store an instruction code in which the register r7 of the register file 21b of the secondary data path 20b is the first source operand, the register r2 is the second source operand, and the register r15 is the destination operand.

In the information processing device according to the first embodiment, the arithmetic-control circuit 10 gives an operation indication to the first arithmetic unit group 22a of the primary data path 20a on the basis of the offload information setting instruction code and the offload processing instruction code. Then, when the operation instructions generated by the arithmetic-control circuit 10 include a first operation instruction on the basis of the offload information setting instruction code, the first arithmetic unit group 22a sets the second instruction code (for example, the offload processing specifying information) to the offload register 31 according to the first operation instruction. Further, when the operation instructions generated by the arithmetic-control circuit 10 include a second operation instruction on the basis of the offload processing instruction code, the first arithmetic unit group 22a provides data to be processed by the second arithmetic unit group 22b to the register file 21b used by the second arithmetic unit group 22b. Then, the second arithmetic unit group 22b repeatedly executes operations on the basis of the operation instructions generated by the offload control circuit 30 based on the offload processing specifying information.

FIGS. 6 to 10 are views showing operations of the information processing device 1 in the case of executing the programs shown in FIGS. 4 and 5. Note that FIGS. 6 to 10 show operations of the information processing device 1 using giving and receiving of data between the register file 21a of the primary data path 20a and the register file 21b of the secondary data path 20b.

FIG. 6 is a view showing the operation of the information processing device 1 in a cycle 1. As shown in FIG. 6, in the cycle 1, no operation is made on the register files 21a and 21b. In the cycle 1, the first arithmetic unit group 22a operates on the basis of the offload information setting instruction code. The first arithmetic unit group 22a reads the offload processing specifying information from the data cache 23b and stores the information into the offload register 31 of the offload control circuit 30. Note that, in the cycle 1, x in the register files 21a and 21b indicates an undefined value. Further, it is assumed that constants 0 and 49 are prestored respectively in the registers r1 and r3 of the register file 21b in the cycle 1. Furthermore, it is assumed that data to be used in the following calculation is stored in the register file 21a in the cycle 1.

Figure 7:
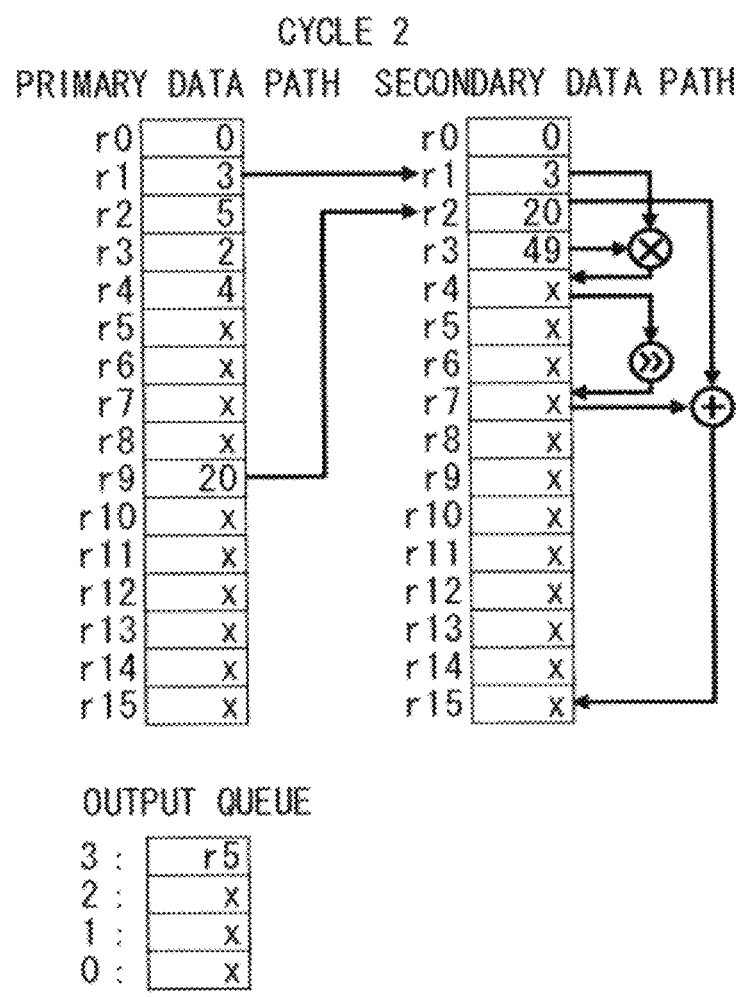
FIG. 7 is a view showing an operation in a cycle 2 of the information processing device when the programs shown in FIGS. 4 and 5 are executed.

FIG. 7 shows the operation of the information processing device 1 in a cycle 2. In the cycle 2, the arithmetic-control circuit 10 generates operation instructions on the basis of the offload processing instruction code in the second row of FIG. 4. Then, the first arithmetic unit group 22a stores the data stored in the registers r1 and r9 of the register file 21a into the registers r1 and r2 of the register file 21b according to the operation instructions generated by the arithmetic-control circuit 10. Further, a value indicating the register r5 as a register to store a processing result for the data provided to the second arithmetic unit group 22b in the cycle 2 is stored into the third output queue. The value stored in the output queue is shifted to the queue with the smaller number one by one as the cycle progresses.

Further, in the cycle 2, the second arithmetic unit group 22b executes operations according to the operation instructions generated by the offload control circuit 30. However, because the value stored in the register r1 in the cycle 1 is an undefined value, an undefined value is stored in the register r4. Further, because the values used for operations of the values to be stored in the registers r7 and r15 include undefined values, the values stored in the registers r7 and r15 are also undefined values.

Figure 8:
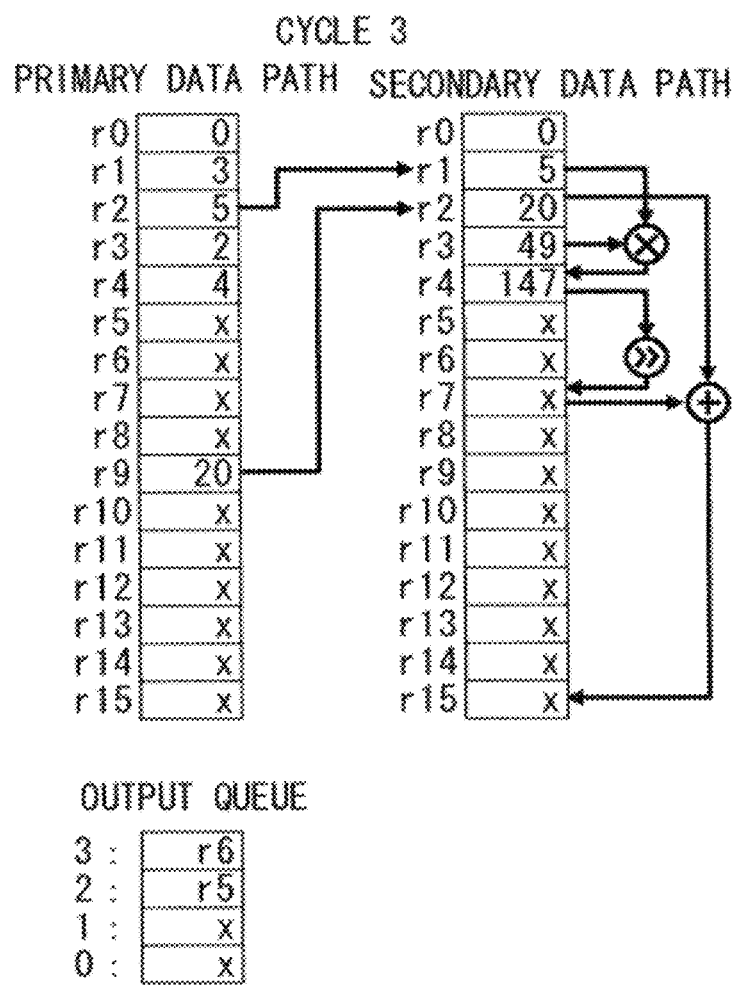
FIG. 8 is a view showing an operation in a cycle 3 of the information processing device when the programs shown in FIGS. 4 and 5 are executed.

FIG. 8 shows the operation of the information processing device 1 in a cycle 3. In the cycle 3, the arithmetic-control circuit 10 generates operation instructions on the basis of the offload processing instruction code in the third row of FIG. 4. Then, the first arithmetic unit group 22a stores the data stored in the registers r2 and r9 of the register file 21a into the registers r1 and r2 of the register file 21b according to the operation instructions generated by the arithmetic-control circuit 10. Further, a value indicating the register r6 as a register to store a processing result for the data provided to the second arithmetic unit group 22b in the cycle 3 is stored into the third output queue. At this time, the value indicating the register r5 stored in the third output queue in the cycle 2 is moved to the second output queue in the cycle 3.

Further, in the cycle 3, the second arithmetic unit group 22b executes operations according to the operation instructions generated by the offload control circuit 30. Specifically, a result of multiplication of the value stored in the register r1 of the register file 21b in the cycle 2 (which is 3 in the example shown in FIG. 7) and the value of the register r3 (which is 49 in the example shown in FIG. 7) is stored into the register r4. However, because the values used for operations of the values to be stored in the registers r7 and r15 include undefined values, the values stored in the registers r7 and r15 are undefined values.

Figure 9:
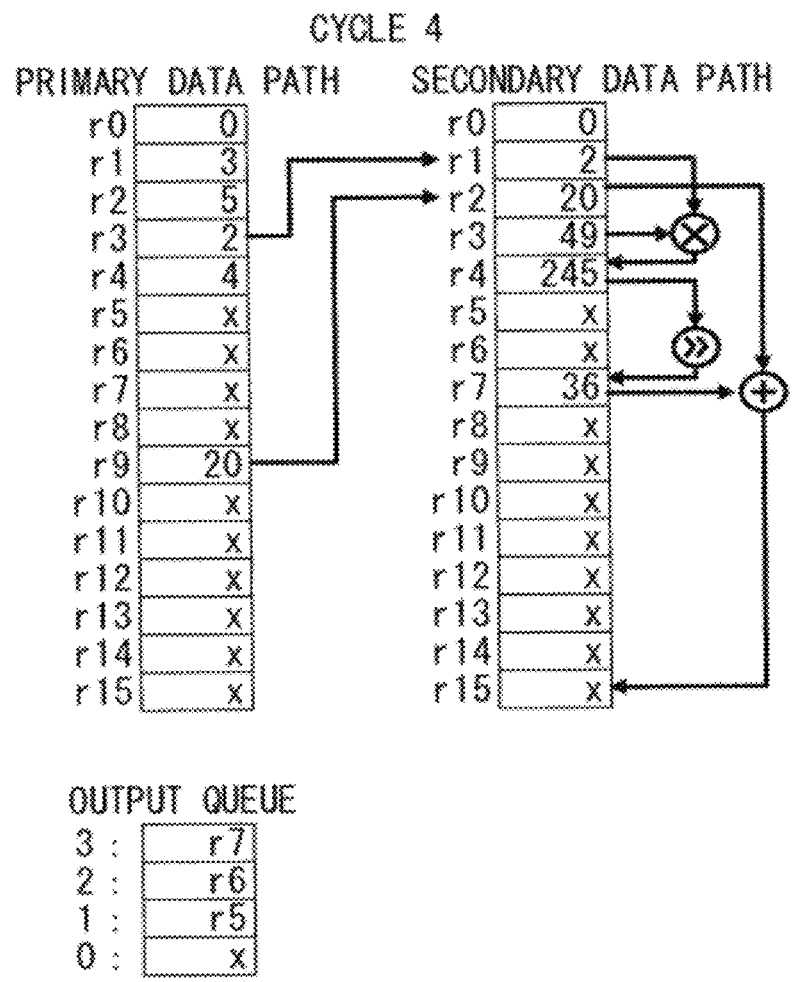
FIG. 9 is a view showing an operation in a cycle 4 of the information processing device when the programs shown in FIGS. 4 and 5 are executed.

FIG. 9 shows the operation of the information processing device 1 in a cycle 4. In the cycle 4, the arithmetic-control circuit 10 generates operation instructions on the basis of the offload processing instruction code in the fourth row of FIG. 4. Then, the first arithmetic unit group 22a stores the data stored in the registers r3 and r9 of the register file 21a into the registers r1 and r2 of the register file 21b according to the operation instructions generated by the arithmetic-control circuit 10. Further, a value indicating the register r7 as a register to store a processing result for the data provided to the second arithmetic unit group 22b in the cycle 4 is stored into the third output queue. At this time, the value indicating the register r6 stored in the third output queue in the cycle 3 is moved to the second output queue in the cycle 4, and the value indicating the register r5 stored in the second output queue in the cycle 3 is moved to the first output queue in the cycle 4.

Further, in the cycle 4, the second arithmetic unit group 22b executes operations according to the operation instructions generated by the offload control circuit 30. Specifically, a result of multiplication of the value stored in the register r1 of the register file 21b in the cycle 3 (which is 5 in the example shown in FIG. 8) and the value of the register r3 (which is 49 in the example shown in FIG. 8) is stored in the register r4. Further, a value obtained by shifting the value stored in the register r4 of the register file 21b in the cycle 3 to the right by two bits (an integer component of the value obtained by dividing the value of r4 by 4) is stored into the register r7. However, because an undefined value is included in the value used for an operation of the value to be stored in the register r15, the value stored in the register r15 is an undefined value.

Figure 10:
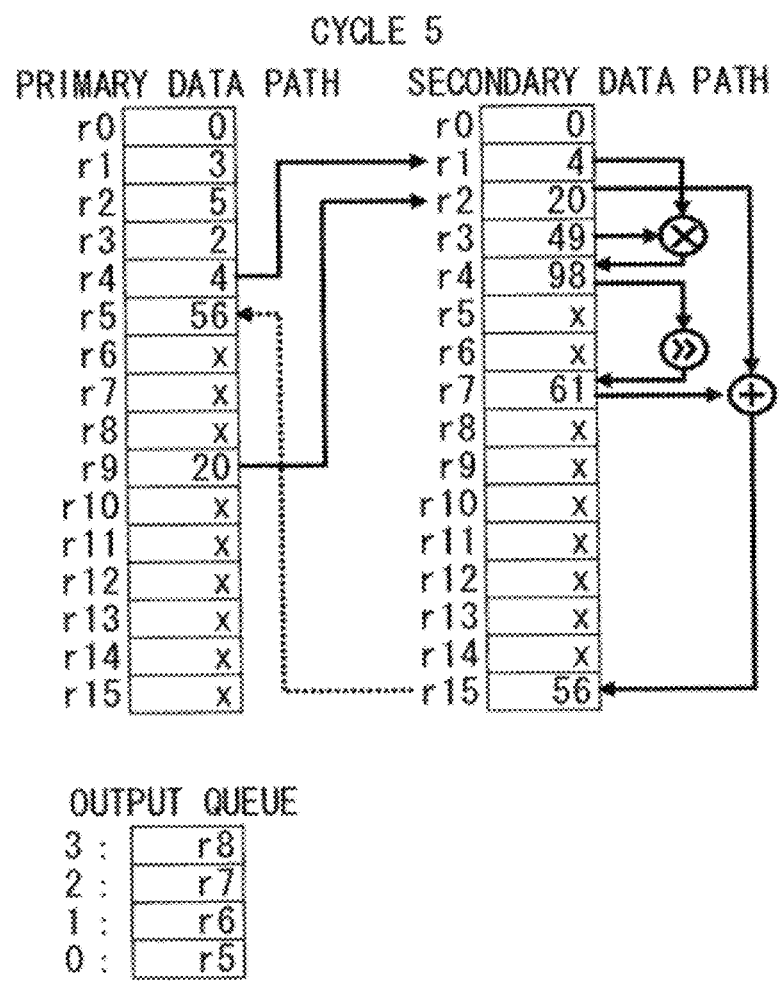
FIG. 10 is a view showing an operation in a cycle 5 of the information processing device when the programs shown in FIGS. 4 and 5 are executed.

FIG. 10 shows the operation of the information processing device 1 in a cycle 5. In the cycle 5, the arithmetic-control circuit 10 generates operation instructions on the basis of the offload processing instruction code in the fifth row of FIG. 4. Then, the first arithmetic unit group 22a stores the data stored in the registers r4 and r9 of the register file 21a into the registers r1 and r2 of the register file 21b according to the operation instructions generated by the arithmetic-control circuit 10. Further, a value indicating the register r8 as a register to store a processing result for the data provided to the second arithmetic unit group 22b in the cycle 5 is stored into the third output queue. At this time, the value indicating the register r7 stored in the third output queue in the cycle 4 is moved to the second output queue, the value indicating the register r6 stored in the second output queue in the cycle 4 is moved to the first output queue, and the value indicating the register r5 stored in the first output queue in the cycle 4 is moved to the 0th output queue.

Further, in the cycle 5, the second arithmetic unit group 22b executes operations according to the operation instructions generated by the offload control circuit 30. Specifically, a result of multiplication of the value stored in the register r1 of the register file 21b in the cycle 4 (which is 2 in the example shown in FIG. 9) and the value of the register r3 (which is 49 in the example shown in FIG. 8) is stored in the register r4. Further, a value obtained by shifting the value stored in the register r4 of the register file 21b in the cycle 4 to the right by two bits (an integer component of the value obtained by dividing the value of r4 by 4) is stored in the register r7. Further, a result of addition of the values stored in the registers r2 and r7 of the register file 21b in the cycle 4 is stored into the register r15. Then, the value stored in the register r15 is stored into the register r5 of the register file 21a based on the value of the 0th output queue.

As described above, in the information processing device 1 according to the first embodiment, the first arithmetic unit group 22a can provide instructions for operations to the second arithmetic unit group 22b by simply performing processing according to operation instructions generated on the basis of a single instruction code (for example, the offload processing instruction code). Further, the operations performed by the second arithmetic unit group 22b can be set simply on the basis of the offload information setting instruction code. Furthermore, the number of cycles required for the setting process is one. Specifically, in the information processing device 1, the arithmetic-control circuit 10 gives a plurality of operation instructions to the first arithmetic unit group 22a on the basis of the instruction code that includes the offload information setting instruction code or the offload processing instruction code and instruction codes other than the two instruction codes, so that the first arithmetic unit group 22a can execute other processing on the basis of the instruction codes other than the offload information setting instruction code and the offload processing instruction code in parallel.

The operation of the information processing device 1 in the case of performing the above parallel processing is described hereinafter with reference to a specific example. In the following, the case where the information processing device 1 performs calculation of a 3×3 Sobel filter is described as an example of the processing. The calculation of a Sobel filter is a technique used to make edge detection in the field of image processing and has a feature that the same operation is repeatedly performed for different data.

FIG. 11 shows an example of a program to perform calculation of a 3×3 Sobel filter. In the program shown in FIG. 11, DOUT[y][x] representing output data is defined as a long int variable, as a variable used for operations. Further, a memory area of 480×640 is specified for the output data DOUT.

Then, as a specific operation, a first loop process in which x=1 is set as an initial value, x is incremented by one each time a loop is completed, and processing is repeated until x reaches 479 is defined. Further, a second loop process in which y=1 is set as an initial value, y is incremented by one each time a loop is completed, and processing is repeated until y reaches 639 is defined. Then, in the second loop process, a calculation formula for a value (DOUT[y][x]) of an operation target pixel is described. In this calculation formula, DIN indicates an input pixel value for calculating the value of the operation target pixel, followed by the coordinates indicating the position of DIN in the image.

Further, in the calculation of a 3×3 Sobel filter, it is necessary to calculate the address DOUT[y][x] in a data cache to store calculated output data. FIG. 12 shows an example of a program to calculate an effective address to store the output data DOUT[y][x]. In the example shown in FIG. 12, the effective address value "address" is shown on the left-hand side, and the calculation formula of the effective address value is shown on the right-hand side. In this program example, calculation is performed to store a new pixel value into an address obtained by adding results of multiplying a y-coordinate value by 2560(640×4) and an x-coordinate value by 4 (because one pixel is represented by four bites, and one row of the image contains 640 pixels) to a top address "base" of the region where the operation target image is stored.

The operations of the information processing device 1 based on the program examples shown in FIGS. 11 and 12 are specifically described hereinbelow. In the following description, it is assumed that the Sobel filter calculation of shown in FIG. 11 is performed in the first arithmetic unit group 22a, and the address calculation shown in FIG. 12 is performed in the second arithmetic unit group 22b. This is because the address calculation requires a smaller variety of arithmetic units than the Sobel filter calculation and therefore the address calculation is more suitable for offload processing.

It is also assumed that the arithmetic-control circuit 10 issues the maximum four operation instructions at the same time. Further, it is assumed that the first arithmetic unit group 22a at least includes two shift left logical units SLL, two subtracters SUB, two adders ADD, one comparator CMP, one load unit LD, one offload setting instruction unit setofld, one offload processing instruction unit ofld, one store unit ST, one branch instruction unit BNZ that repeats a loop, and one data move instruction unit MV. It is assumed that the second arithmetic unit group 22b at least includes one multiplier MUL, one shift left logical unit SLL, and two adders ADD. Further, to calculate the value of the output data DOUT[y][x], it is assumed that DIN[y−1][x−1], DIN[y−1][x+1], DIN[y][x−1] and DIN[y][x+1] are stored in the register file 21a in advance. Further, it is assumed that in the process of calculating the value of the output data DOUT[y][x], DIN[y+1][x−1] and DIN[y+1][x+1] are newly read from the data cache.

Figure 13:
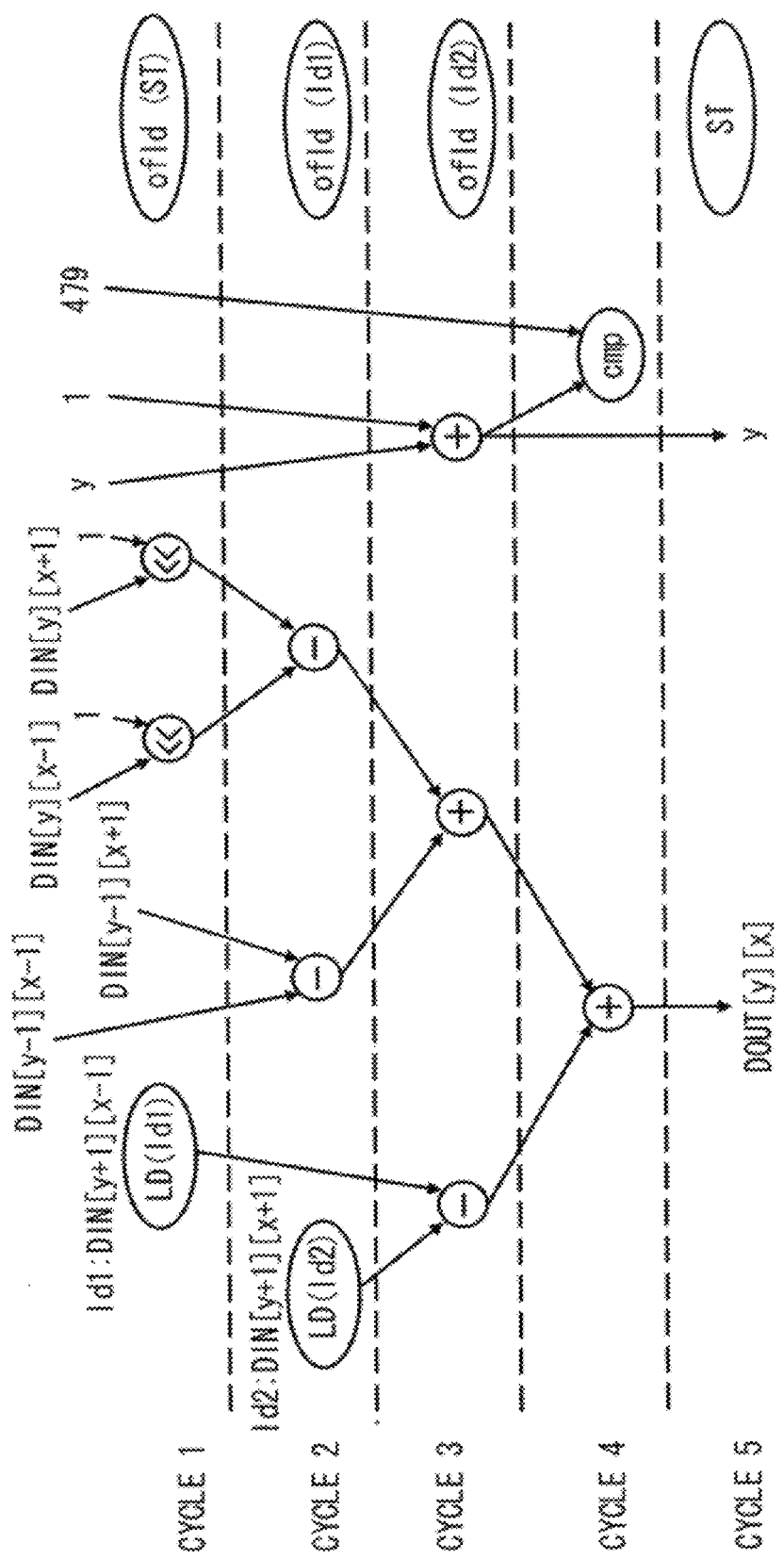
FIG. 13 is a sequence chart showing a process sequence of the primary data path of the information processing device that executes the program shown in FIG. 11.

FIG. 13 shows an operation flow in the case where the information processing device 1 performs a process based on the program shown in FIG. 11. As described above, it is assumed that the operation based on the program shown in FIG. 11 is executed in the first arithmetic unit group 22a.

As shown in FIG. 13, in the cycle 1, the first arithmetic unit group 22a performs loading of DIN[y+1][x−1], a shift left logical operation for DIN[y][x−1], a shift left logical operation for DIN[y][x+1], and processing based on the offload processing instruction code ofld for calculating the address value of a data cache to store a calculation result of DIN[y][x] as a current processing target. Note that the processing based on the offload processing instruction code ofld in the cycle 1 stores the top address value of a region DOUT to store a processing result, the value of x and the value of y into the register file 21b. The address value obtained according to the offload processing specified in the cycle 1 is used for store processing in the cycle 5, which is described later.

Next, in the cycle 2, the first arithmetic unit group 22a performs loading of DIN[y+1][x+1], subtraction of DIN[y−1][x−1] and DIN[y−1][x+1], subtraction of a result of the shift left logical operation for DIN[y][x−1] and a result of the shift left logical operation for DIN[y][x+1], and processing based on the offload processing instruction code ofld for calculating the address value of a data cache that stores DIN[y+1][x−1] to be used for the next processing. Note that the processing based on the offload processing instruction code ofld in the cycle 2 stores the top address value of an image region DIN to be processed, the value of (x−1) and the value of y into the register file 21b. The address value obtained according to the offload processing specified in the cycle 2 is used for calculation of a Sobel filter for the next pixel.

Then, in the cycle 3, the first arithmetic unit group 22a performs subtraction of DIN[y+1][x+1] and DIN[y+1][x−1], addition of the two subtraction results performed in the cycle 2, addition of the current value of y and the value 1, and processing based on the offload processing instruction code ofld for calculating the address value of a data cache that stores DIN[y+1][x+1] to be used for the next processing. Note that the processing based on the offload processing instruction code ofld in the cycle 3 stores the top address value of the image region DIN to be processed, the value of (x+1) and the value of y into the register file 21b. The address value obtained according to the offload processing specified in the cycle 3 is used for calculation of a Sobel filter for the next pixel.

Then, in the cycle 4, the first arithmetic unit group 22a performs addition of the subtraction result performed in the cycle 3 and the addition result related DIN performed in the cycle 3, and comparison in value between the addition result of the value of y and the value 1 and the upper limit value of y (479).

Then, in the cycle 5, the first arithmetic unit group 22a performs store processing of the value of the output data DOUT[y][x] from the second arithmetic unit group 22b and updates of the value of y.

Figure 14:
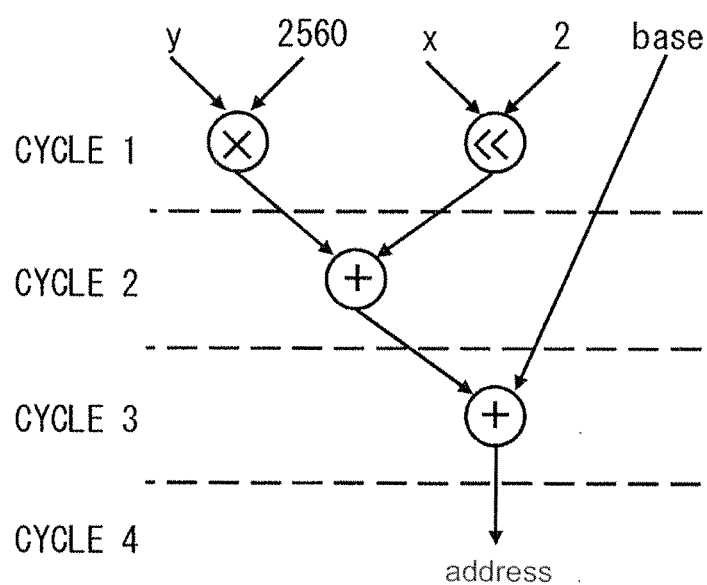
FIG. 14 is a sequence chart showing a process sequence of the secondary data path of the information processing device that executes the program shown in FIG. 12.

FIG. 14 shows an operation flow in the case where the information processing device 1 performs a process based on the program shown in FIG. 12. As described above, it is assumed that the operation based on the program shown in FIG. 12 is executed in the second arithmetic unit group 22b.

As shown in FIG. 14, in the cycle 1, the second arithmetic unit group 22b performs multiplication of the value of y and the value 2560, and a shift left logical operation of the value of x by two bits (multiplication of x and 4). Next, in the cycle 2, the second arithmetic unit group 22b performs addition of the two operation results performed in the cycle 1. Then, in the cycle 3, the second arithmetic unit group 22b performs addition of the addition result performed in the cycle 2 and the top address "base" of the image. Then, in the cycle 4, the second arithmetic unit group 22b stores the calculated new address value DOUT into a predetermined register of the register file 21b. Note that, because the offload control circuit 30 always issues four operation instructions at the same time based on the instruction code stored in the offload register, the second arithmetic unit group 22b always performs other operations as well, though not shown. For example, the addition of the cycle 2 and the addition of the cycle 3 are performed also in the cycle 1.

Figure 15:
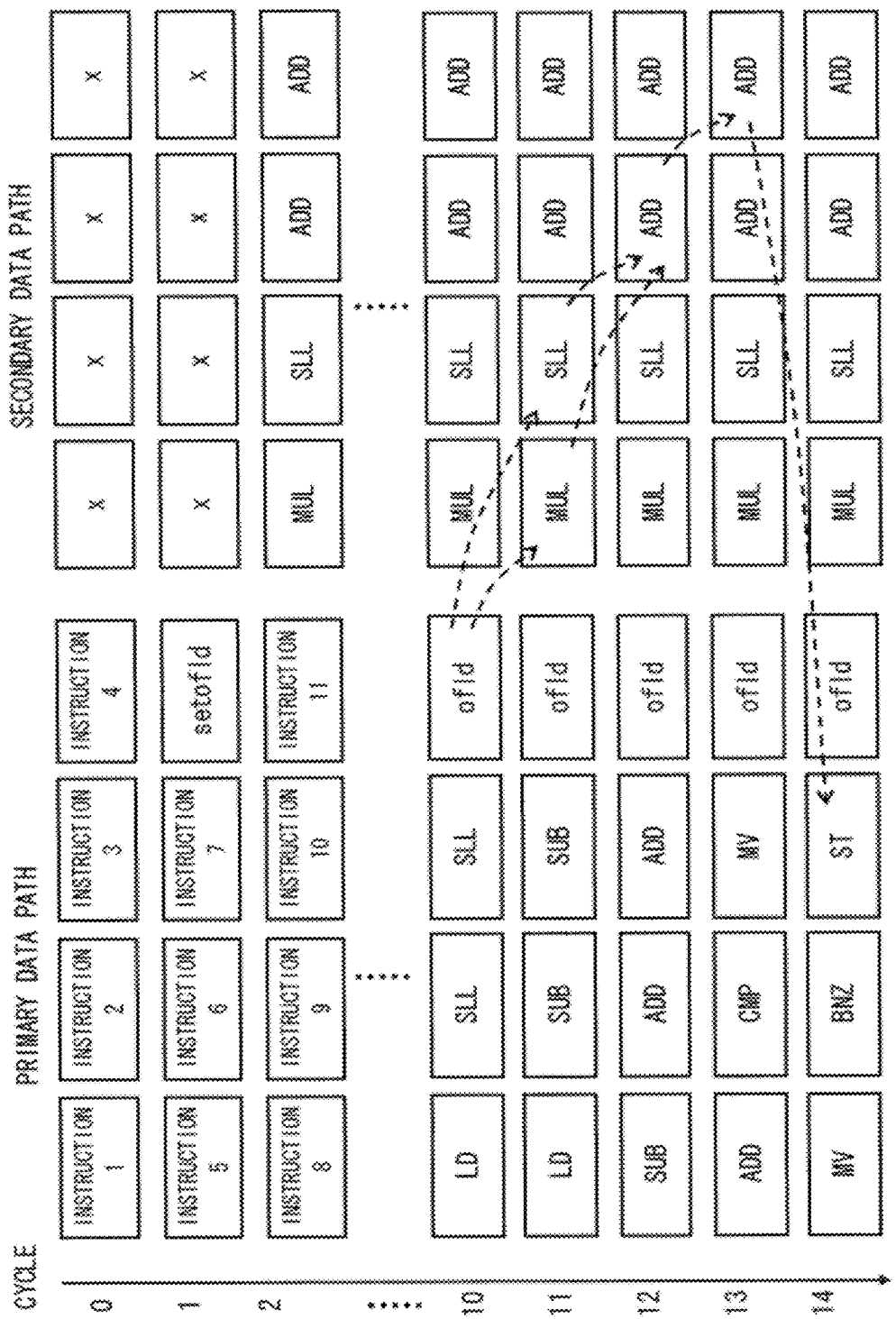
FIG. 15 is a sequence chart showing an operation of the information processing device when executing the programs shown in FIGS. 11 and 12.

FIG. 15 is a sequence chart showing the operation of the information processing device 1 in the case of executing the programs shown in FIGS. 11 and 12. In FIG. 15, a process flow of instruction codes executed in the respective arithmetic units is shown, focusing attention on the relationship of the processes shown in FIGS. 13 and 14. Note that in FIG. 15, the instruction codes are denoted by the same reference symbols as those of the arithmetic units operating in accordance with the instruction codes.

In the example shown in FIG. 15, an operation indication on the basis of the offload information setting instruction code setofld is provided to the primary data path 20a in the cycle 1. In response to the operation indication on the basis of the offload information setting instruction code setofld in the cycle 1, operations to be used for processing of the secondary data path 20b are determined in the cycle 2. In the example of FIG. 15, the processing of the secondary data path 20b is executed by one multiplier MUL, one shift left logical unit SLL, and two adders ADD.

Then, in the cycle 10, an operation instruction on the basis of the offload processing instruction code ofld is given to the primary data path 20a. Further, in the cycle 10, processing on the basis of a load instruction code LD and processing on the basis of two shift left logical instruction codes SLL are indicated together with the offload processing instruction code ofld. Furthermore, in the cycle 10, operations in accordance with the instruction codes set to the secondary data path 20b in the cycle 2 are performed. Thus, in the processing of the cycle 10, processing corresponding to the processing of the cycle 1 in FIG. 13 is performed.

Then, in the cycle 11, an operation instruction on the basis of the offload processing instruction code ofld is given to the primary data path 20a. Further, in the cycle 11, processing on the basis of the load instruction code LD and processing on the basis of two subtraction instruction codes SUB are indicated together with the offload processing instruction code ofld. Furthermore, in the cycle 11, operations in accordance with the instruction codes set to the secondary data path 20b in the cycle 2 are performed. At this time, in the secondary data path 20b, the operation of the cycle 1 in FIG. 14 is performed on the operational data provided from the primary data path 20a in accordance with the offload processing instruction code issued in the cycle 10. Thus, in the processing of the cycle 11, processing corresponding to the processing of the cycle 2 in FIG. 13 and the processing of the cycle 1 in FIG. 14 is performed.

Then, in the cycle 12, an operation instruction on the basis of the offload processing instruction code ofld is given to the primary data path 20a. Further, in the cycle 12, processing on the basis of the subtraction instruction code SUB and processing on the basis of two addition instruction codes ADD are indicated together with the offload processing instruction code ofld. Furthermore, in the cycle 12, operations in accordance with the instruction codes set to the secondary data path 20b in the cycle 2 are performed. At this time, in the secondary data path 20b, the operation of the cycle 2 in FIG. 14 is performed on the processing result of the secondary data path 20b in the cycle 11. Thus, in the processing of the cycle 12, processing corresponding to the processing of the cycle 3 in FIG. 13 and the processing of the cycle 2 in FIG. 14 is performed.

Then, in the cycle 13, an operation instruction on the basis of the offload processing instruction code ofld is given to the primary data path 20a. Further, in the cycle 13, processing on the basis of the addition instruction code ADD, processing on the basis of the comparison instruction code CMP, and processing on the basis of the data move instruction code MV are indicated together with the offload processing instruction code ofld. Furthermore, in the cycle 13, operations in accordance with the instruction codes set to the secondary data path 20b in the cycle 2 are performed. At this time, in the secondary data path 20b, the operation of the cycle 3 in FIG. 14 is performed on the processing result of the secondary data path 20b in the cycle 12. Thus, in the processing of the cycle 13, processing corresponding to the processing of the cycle 4 in FIG. 13 and the processing of the cycle 3 in FIG. 14 is performed.

In the case where the first arithmetic unit group 22a includes only two adders ADD, it is not possible to perform address calculation and calculation of data DOUT[y][x] in parallel and thereby obtain a calculation result of the data DOUT[y][x] and a result of the address calculation at the same time due to the limited number of adders ADD in the first arithmetic unit group 22a. This is because maximum three adders need to operate simultaneously in order to obtain the two calculation results at the same time. Further, maximum five operation instructions need to be issued simultaneously in order to end the address calculation and the calculation of data DOUT[y][x] at the same time, and the address calculation and the calculation of data DOUT[y][x] cannot be executed in parallel if the number of instructions simultaneously issued by the arithmetic-control circuit 10 is four.

On the other hand, in the information processing device 1 according to the first embodiment, a calculation result of the data DOUT[y][x] and a result of the address calculation can be obtained at the same time even when there is a limit to the number of operations that can be processed in parallel in the first arithmetic unit group 22a as described above. In the information processing device 1, the first arithmetic unit group 22a sets instruction codes required for processing in the second arithmetic unit group 22b to the offload register 31 in accordance with the operation instructions generated by the arithmetic-control circuit 10 on the basis of the offload information setting instruction code. Then, the offload control circuit 30 generates operation instructions on the basis of the instruction codes stored in the offload register 31. The second arithmetic unit group 22b executes the operations on the basis of the operation instructions generated by the offload control circuit 30. By making the second arithmetic unit group 22b operate in this manner, in the information processing device 1, the first arithmetic unit group 22a only needs to pass data to be processed by the second arithmetic unit group 22b to the second arithmetic unit group 22b side based on the operation instructions generated in accordance with the offload processing instruction code by the arithmetic-control circuit 10, so that the operation for the data can be performed in the second arithmetic unit group 22b. This enables parallel processing combining arithmetic units included in the first arithmetic unit group 22a and the second arithmetic unit group 22b. In this manner, in the information processing device 1, it is possible to execute the number of operations exceeding the limit of the number of arithmetic units included in the first arithmetic unit group 22a in parallel. Further, because the number of operations that can be executed simultaneously practically increases in the information processing device 1, it is possible to reduce the program processing time.

Further, in the information processing device 1, the instruction code to specify the operations to be executed by the second arithmetic unit group 22b can be set arbitrarily by the offload information setting instruction code. Therefore, by generating a larger number of operation instructions than the limit of the number of instructions issued simultaneously by the arithmetic-control circuit 10 in the offload control circuit 30, a larger number of operations than the limit of the number of instructions issued simultaneously by the arithmetic-control circuit 10 can be executed in parallel. Thus, in the information processing device 1, the number of instructions issued simultaneously by the arithmetic-control circuit 10 can practically increase. On the other hand, there is a technique that provides an existing processor with a main arithmetic unit and a dedicated circuit such as a coprocessor and executes a floating-point operation by the coprocessor, for example. However, the dedicated circuit can only perform fixed operations. Further, in the case of executing operations by the dedicated circuit, the main arithmetic unit needs to provide an operation indication and operation data to the dedicated circuit for each of operations, causing a decrease in operating capability of the main arithmetic unit. Thus, the combination of the main arithmetic unit and the dedicated circuit in the existing processor fails to increase the number of operation instructions that can be executed at the same time in the main arithmetic unit.

Second Embodiment

Figure 16:
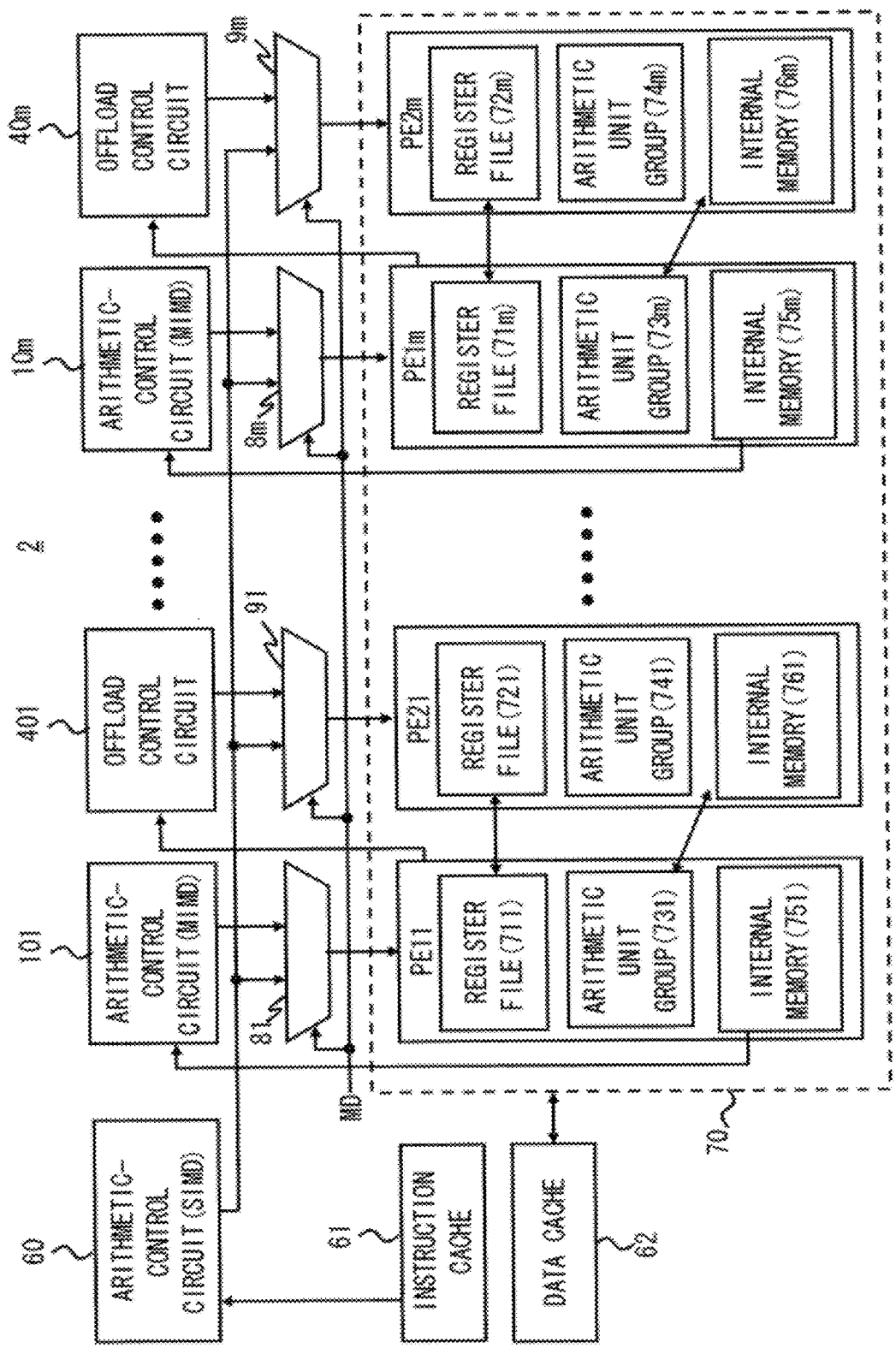
FIG. 16 is a block diagram showing an information processing device according to a second embodiment.

FIG. 16 shows a block diagram of an information processing device 2 according to a second embodiment. As shown in FIG. 16, the information processing device 2 includes first arithmetic-control circuits (for example, arithmetic-control circuits 101 to 10m (m is an integer; the same applies below)), second arithmetic-control circuits (for example, offload control circuits 401 to 40m), a third arithmetic-control circuit (for example, an arithmetic-control circuit 60), an instruction cache 61, a data cache 62, an arithmetic unit 70, first switches 81 to 8m, and second switches 91 to 9m.

Further, in the information processing device 2, the arithmetic unit 70 includes first processor elements (for example, processor elements PE11 to PE1m) and second processor elements (for example, processor elements PE21 to PE2m). Further, the information processing device 2 according to the second embodiment has a first mode (for example, SIMD mode) and a second mode (for example, MIMD mode) as operating modes. In the SIMD mode, the information processing device 2 executes the same operations for different data in parallel in the processor elements PE11 to PE1m and PE21 to PE2m. On the other hand, in the MIMD mode, the information processing device 2 reconfigures the processor elements PE11 to PE1m and the processor elements PE21 to PE2m as a single arithmetic unit, and executes different operations for different data in parallel by a plurality of arithmetic units.

The configuration of the information processing device 2 is described in further detail. The instruction cache 61 stores a third instruction code to be used in the SIMD mode. The data cache 62 stores data to be processed in the SIMD mode. The arithmetic-control circuit 60 reads the third instruction code from the instruction cache 61 and generates operation instructions on the basis of the third instruction code.

The first switches 81 to 8m cause the arithmetic-control circuit 60 to give an operation indication to the processor elements PE11 to PE1m in the SIMD mode, and cause the arithmetic-control circuits 101 to 10m to give an operation indication to the processor elements PE11 to PE1m in the MIMD mode. The second switches 91 to 9m cause the arithmetic-control circuit 60 to give an operation indication to the processor elements PE21 to PE2m in the SIMD mode, and cause the offload control circuits 401 to 40m to give an operation indication to the processor elements PE21 to PE2m in the MIMD mode. Note that the first switches 81 to 8m and the second switches 91 to 9m switch the arithmetic-control circuits from which an operation indication is issued based on a mode switch signal MD supplied from another circuit, which is not shown.

The processor elements PE11 to PE1m include register files 711 to 71m, arithmetic unit groups 731 to 73m, and internal memories 751 to 75m, respectively. Further, the processor elements PE21 to PE2m include register files 721 to 72m, arithmetic unit groups 741 to 74m, and internal memories 761 to 76m, respectively.

The processor elements PE11 to PE1m and PE21 to PE2m perform operations on data stored in the internal memory of its own processor element in the SIMD mode. Specifically, the processor elements PE11 to PE1m and PE21 to PE2m load data from the internal memory to the register file in its own processor element during load processing by the arithmetic unit group, and the arithmetic unit group performs operations using the data in the register file by a plurality of arithmetic units. Then, the processor elements PE11 to PE1m store operation results into the register file and then stores data after operation from the register file into the internal memory in its own processor element during store processing by the arithmetic unit group.

Further, the processor elements PE11 to PE1m use the internal memory in its own processor element as the internal memory 23a (for example, the instruction cache) according to the first embodiment in the MIMD mode. Further, the processor elements PE11 to PE1m use the arithmetic unit group in its own processor element as the first arithmetic unit group 22a according to the first embodiment in the MIMD mode.

The processor elements PE21 to PE2m use the internal memory in its own processor element as the internal memory 23b (for example, the data cache) according to the first embodiment in the MIMD mode. Further, the processor elements PE21 to PE2m use the arithmetic unit group in its own processor element as the second arithmetic unit group 22b according to the first embodiment in the MIMD mode.

Note that, regarding the internal memories 751 to 75m of the processor elements PE11 to PE1m and the internal memories 761 to 76m of the processor elements PE21 to PE2m, the memories that store instruction codes may be used as the instruction cache, and the memories that store data may be used as the data cache in the MIMD mode. Thus, the internal memories 751 to 75m and the internal memories 761 to 76m may be used as any of the caches in the MIMD mode depending on architecture settings.

Figure 17:
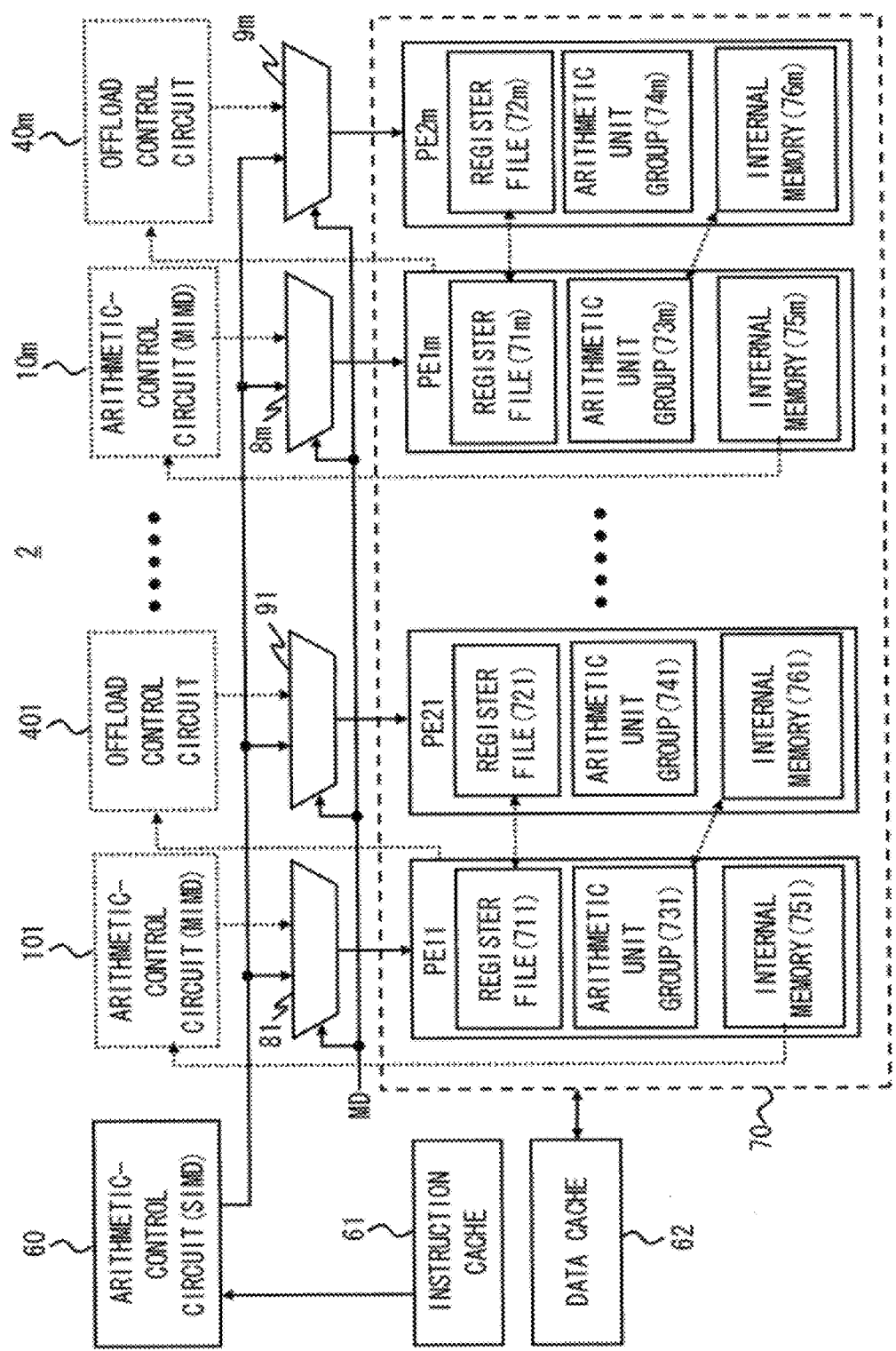
FIG. 17 is a block diagram of an information processing device, showing a circuit block used when the information processing device according to the second embodiment performs an operation in SIMD mode.

FIG. 17 is a block diagram of the information processing device 2 showing the operation in the case where the information processing device 2 operates in the SIMD mode. As shown in FIG. 17, in the SIMD mode, the arithmetic-control circuit 60 generates operation instructions in accordance with the third instruction code stored in the instruction cache 61. The first switches 81 to 8m and the second switches 91 to 9m give the operation instructions generated by the arithmetic-control circuit 60 to the processor elements PE11 to PE1m and the processor elements PE21 to PE2m, respectively, based on the mode switch signal MD. Therefore, the arithmetic-control circuits 101 to 10m and the offload control circuits 401 to 40m are in a practically disabled state. Further, in the SIMD mode, paths between the processor elements PE11 to PE1m and the processor elements PE21 to PE2m are disabled.

Then, the processor elements PE11 to PE1m and PE21 to PE2m load data to be processed from the data cache 62 to the internal memories 751 to 75m and the internal memories 761 to 76m, respectively, based on the operation instructions generated by the arithmetic-control circuit 60. After that, the processor elements PE11 to PE1m and PE21 to PE2m perform the same operations on the data stored in the internal memory in its own processor element based on the operation instructions generated by the arithmetic-control circuit 60. Thus, in the SIMD mode, the information processing device 1 performs the same operations on different data in parallel using a plurality of processor elements, thereby allowing fast processing. Such operations in the SIMD mode are effective when making edge extraction of a single large image, for example. For example, fast image processing can be done by dividing a single large image into strip pieces and processing a plurality of divided regions by a plurality of processor elements in a shared manner.

Figure 18:
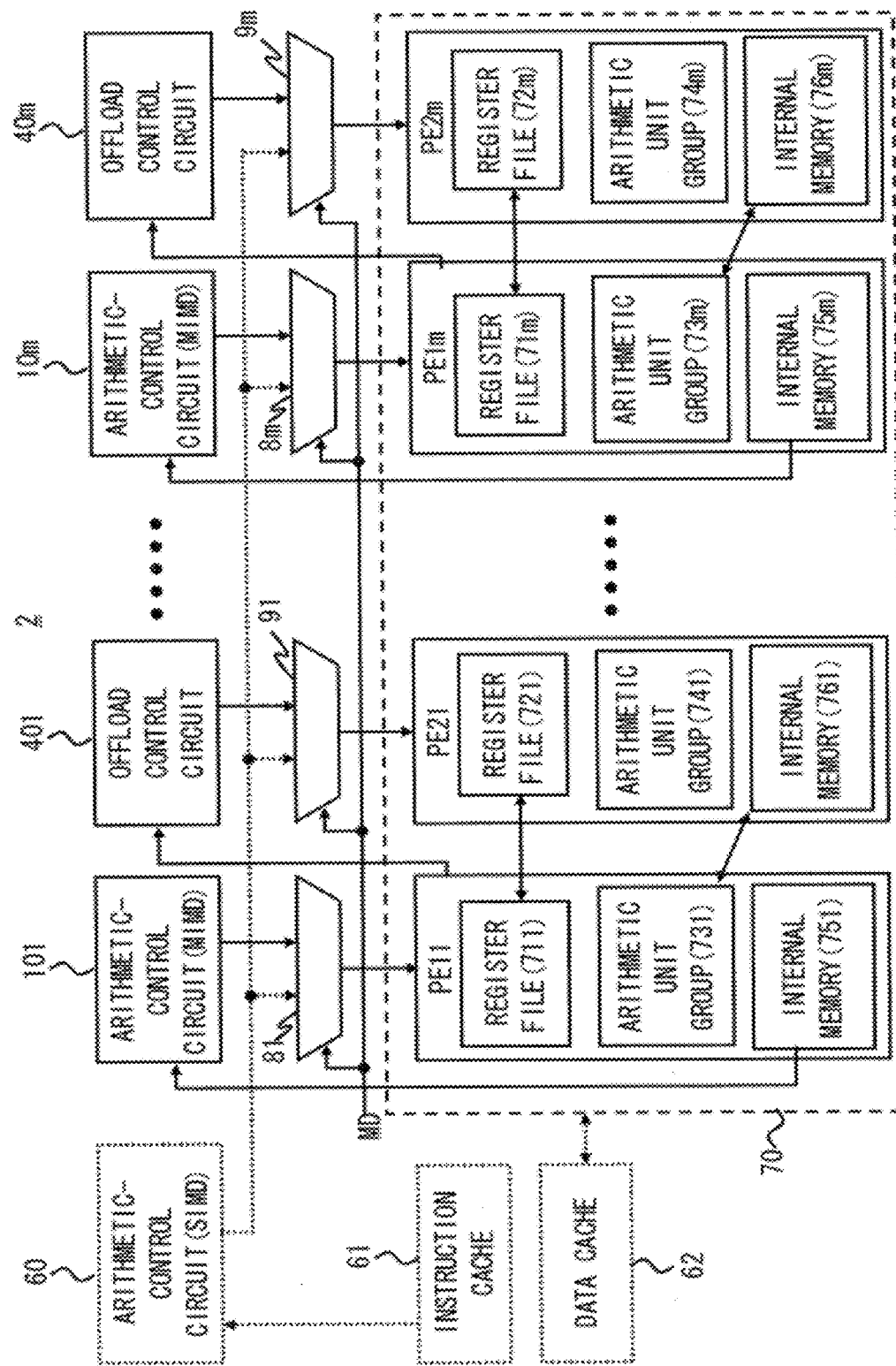
FIG. 18 is a block diagram of an information processing device, showing a circuit block used when the information processing device according to the second embodiment performs an operation in MIMD mode.

FIG. 18 is a block diagram of the information processing device 2 showing the operation in the case where the information processing device 2 operates in the MIMD mode. As shown in FIG. 18, in the MIMD mode, the arithmetic-control circuits 101 to 10m generate operation instructions in accordance with the first instruction code stored in the instruction cache and the internal memories 751 to 75m used. The first switches 81 to 8m give the operation instructions generated by the arithmetic-control circuits 101 to 10m to the processor elements PE11 to PE1m based on the mode switch signal MD. The second switches 91 to 9m give the operation instructions generated by the offload control circuits 401 to 40m to the processor elements PE21 to PE2m based on the mode switch signal MD. Therefore, the arithmetic-control circuit 60 is in a practically disabled state. Further, in the MIMD mode, the instruction cache 61 and the data cache 62 are also disabled. On the other hand, in the MIMD mode, paths between the processor elements PE11 to PE1m and the processor elements PE21 to PE2m are enabled.

In the MIMD mode, the same configuration as the information processing device 1 according to the first embodiment can be achieved by the processor elements PE11 and PE21, the arithmetic-control circuit 101 and the offload control circuit 401 by reconfiguring the processor as described above. Further, in the example shown in FIG. 18, the information processing device 2 can include m-number of circuit configurations corresponding to the information processing device 1 according to the first embodiment. Thus, the information processing device 2 can include m-number of processors independent of one another in the MIMD mode. By performing operations with this configuration in the MIMD mode, it is possible to process each of a plurality of independent regions in one large image by a plurality of processors in a shared manner. In the case of processing a plurality of regions with different sizes by the information processing device 2 in the SIMD mode, it is necessary to process the regions one after another. Accordingly, the processing time in the case of processing such an image using the information processing device 2 in the SIMD mode becomes longer in proportion to the total of the sizes of the plurality of regions. On the other hand, in the case of processing a plurality of regions with different sizes by the information processing device 2 in the MIMD mode, it is possible to process the regions in parallel using a plurality of processors (the information processing device 1 according to the first embodiment). Accordingly, the processing time in the case of processing such an image using the information processing device 2 in the MIMD mode is the time to process the image of the largest region among the plurality of regions, at the longest. Thus, in the case of processing a plurality of independent image regions, the processing in the MIMD mode achieves shorter-time processing.

The above-mentioned technique to reconfigure the configurations of a plurality of processor elements in the SIMD mode and the MIMD mode is disclosed in Kyo et al. However, in the processor described in Kyo et al., in the case of constituting one arithmetic unit by a plurality of processor elements in the MIMD mode and performing parallel processing by a plurality of arithmetic units as a whole processor, an arithmetic unit group that can be used by one arithmetic unit is limited to one of a plurality of arithmetic unit groups belonging to a plurality or processor elements. Thus, the processor described in Kyo et al., has a problem that only one of a plurality of arithmetic unit groups included in one arithmetic unit can be used in the MIMD mode, which causes throughput to be limited. Further, the processor described in Kyo et al., has a problem that circuit resources go to waste in the MIMD mode.

However, in the information processing device 2 according to the second embodiment, all arithmetic unit groups that belong to a plurality of processor elements constituting one arithmetic unit can be used for processing by using the offload control circuits 401 to 40m in the MIMD mode. Therefore, in the information processing device 2 according to the second embodiment, higher throughput than the processor described in Kyo et al. can be achieved in the MIND mode. Further, in the information processing device 2 according to the second embodiment, circuit resources can be effectively used, thereby enhancing the efficiently of the circuit area for throughput.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An information processing device comprising:
a first cache that stores a first instruction code comprising a plurality of specific instruction codes;
a second cache that stores data to be processed;
first and second arithmetic unit group circuits configured to execute operations on the data by a plurality of arithmetic units configured to operate in parallel;
a first arithmetic-control circuit configured to read the first instruction code, and to generate one or more operation instructions for the first arithmetic unit group circuit based on the first instruction code; and
a second arithmetic-control circuit configured to include a fixed instruction register fixed in length that stores a second instruction code, comprising one or more specific instruction codes, specified by the first arithmetic unit group circuit, and to generate one or more operation instructions for the second arithmetic unit group circuit based on the second instruction code, wherein
the first instruction code at least includes first and second specific instruction codes,
when the one or more operation instructions generated by the first arithmetic-control circuit include a first operation instruction on a basis of the first specific instruction code, the first arithmetic unit group circuit is configured to set the second instruction code to the fixed instruction register in accordance with the first operation instruction, and when the one or more operation instructions generated by the first arithmetic-control circuit include a second operation instruction on a basis of the second specific instruction code, the first arithmetic unit group circuit is configured to provide data to be processed by the second arithmetic unit group circuit to the second arithmetic unit group circuit, and
the second arithmetic unit group circuit repeatedly executes operations on a basis of the one or more operation instructions generated based on the second instruction code by the second arithmetic-control circuit, wherein the first arithmetic unit group circuit and the second arithmetic unit group circuit have an identical but separate configuration of the plurality of arithmetic units, such that the first arithmetic unit group circuit and the second arithmetic unit group circuit have identical arithmetic units interconnected in the same manner.

2. The information processing device according to claim 1, wherein the first instruction code includes a plurality of specific instruction codes executable by arithmetic units configured to operate in parallel in the first arithmetic unit group circuit.

3. The information processing device according to claim 1, wherein the fixed instruction register stores a plurality of specific instruction codes executable by arithmetic units configured to operate in parallel in the second arithmetic unit group circuit.

4. The information processing device according to claim 1, wherein, when the first arithmetic-control circuit indicates an operation based on an instruction code different from the first and second specific instruction codes, the first arithmetic unit group circuit is configured to perform the operation on the data in the second cache by an arithmetic unit in the first arithmetic unit group circuit.

5. The information processing device according to claim 1, comprising:
an instruction cache that stores a third instruction code used in a first mode;
a data cache that stores data to be processed in the first mode;
a third arithmetic-control circuit configured to generate an operation instruction based on the third instruction code;
a first processor element that includes a first internal memory, which is one of the first cache or the second cache, which store the first instruction code and data to be processed, respectively, in a second mode, and the first arithmetic unit group circuit;
a second processor element that includes a second internal memory, which is another one of the first cache or the second cache, which store the first instruction code and data to be processed, respectively, in the second mode, and the second arithmetic unit group circuit;
a first switch that gives an operation indication from the third arithmetic-control circuit to the first processor element in the first mode and gives an operation indication from the first arithmetic-control circuit to the first processor element in the second mode; and
a second switch that gives an operation indication from the third arithmetic-control circuit to the second processor element in the first mode and gives an operation indication from the second arithmetic-control circuit to the second processor element in the second mode.

6. The information processing device according to claim 5, wherein
the first internal memory stores data to be processed by the first arithmetic unit group circuit in the first mode, and stores one of the first instruction code and target data to be processed in the second mode,
the second internal memory stores data to be processed by the second arithmetic unit group circuit in the first mode, and stores another one of the first instruction code and the target data to be processed in the second mode, and
the first and second arithmetic unit group circuits are configured to execute operations on a basis of the operation indication from the third arithmetic-control circuit for data provided from the data cache in the first mode, and to perform reading and writing of the data in one of the first and second internal memories that is storing the target data to be processed in the second mode.

* * * * *